A. E. NORRIS.
RAIL CLAMP FOR CONVEYING STRUCTURES.
APPLICATION FILED NOV. 13, 1914. RENEWED NOV. 29, 1918.

1,308,859.

Patented July 8, 1919.
5 SHEETS—SHEET 1.

Witnesses:
Horace A. Crosman
Llewellyn Richards

Inventor:
Almon E. Norris

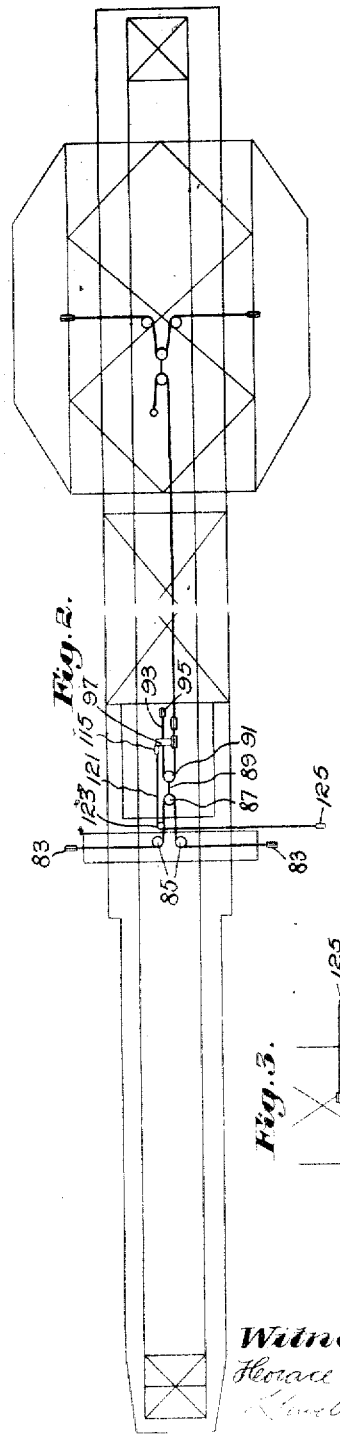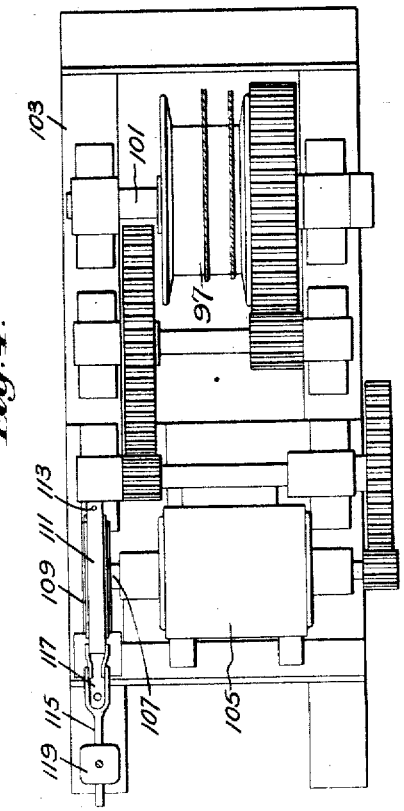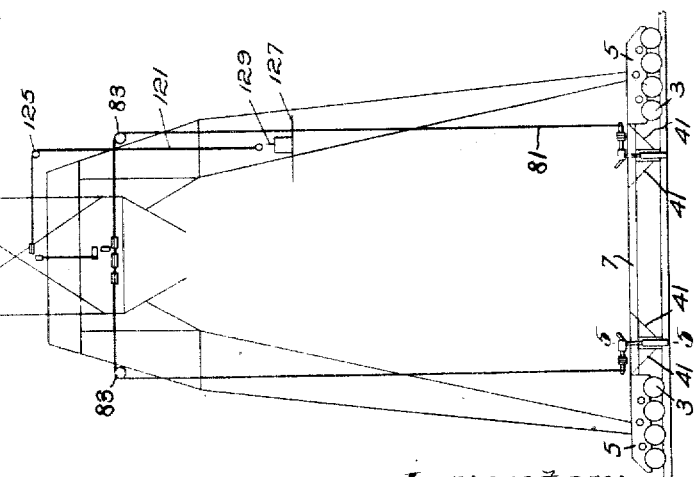

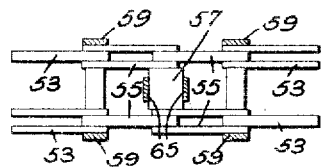
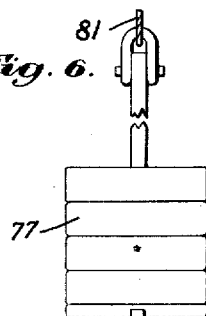
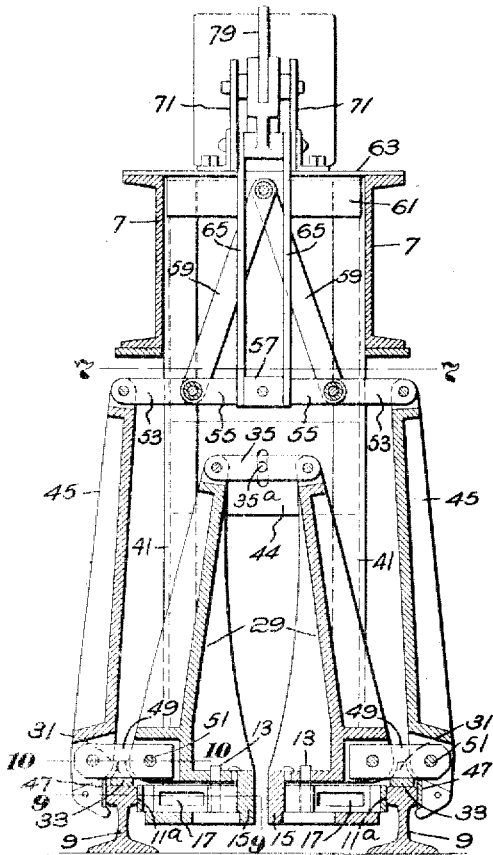
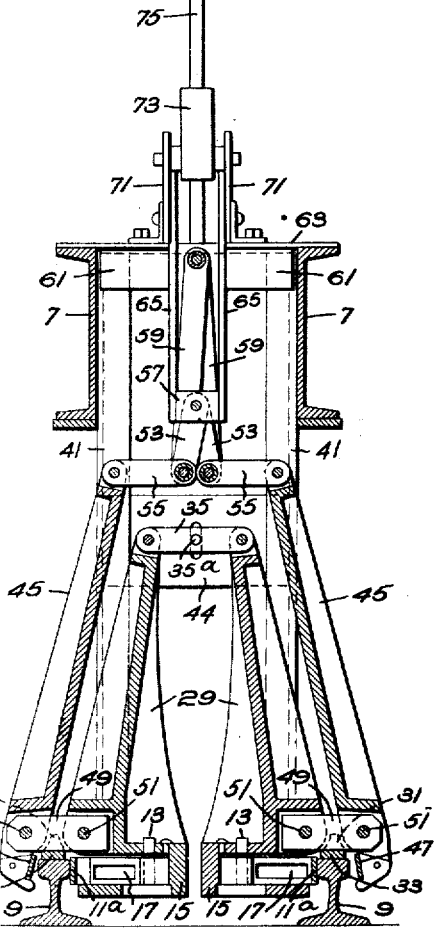

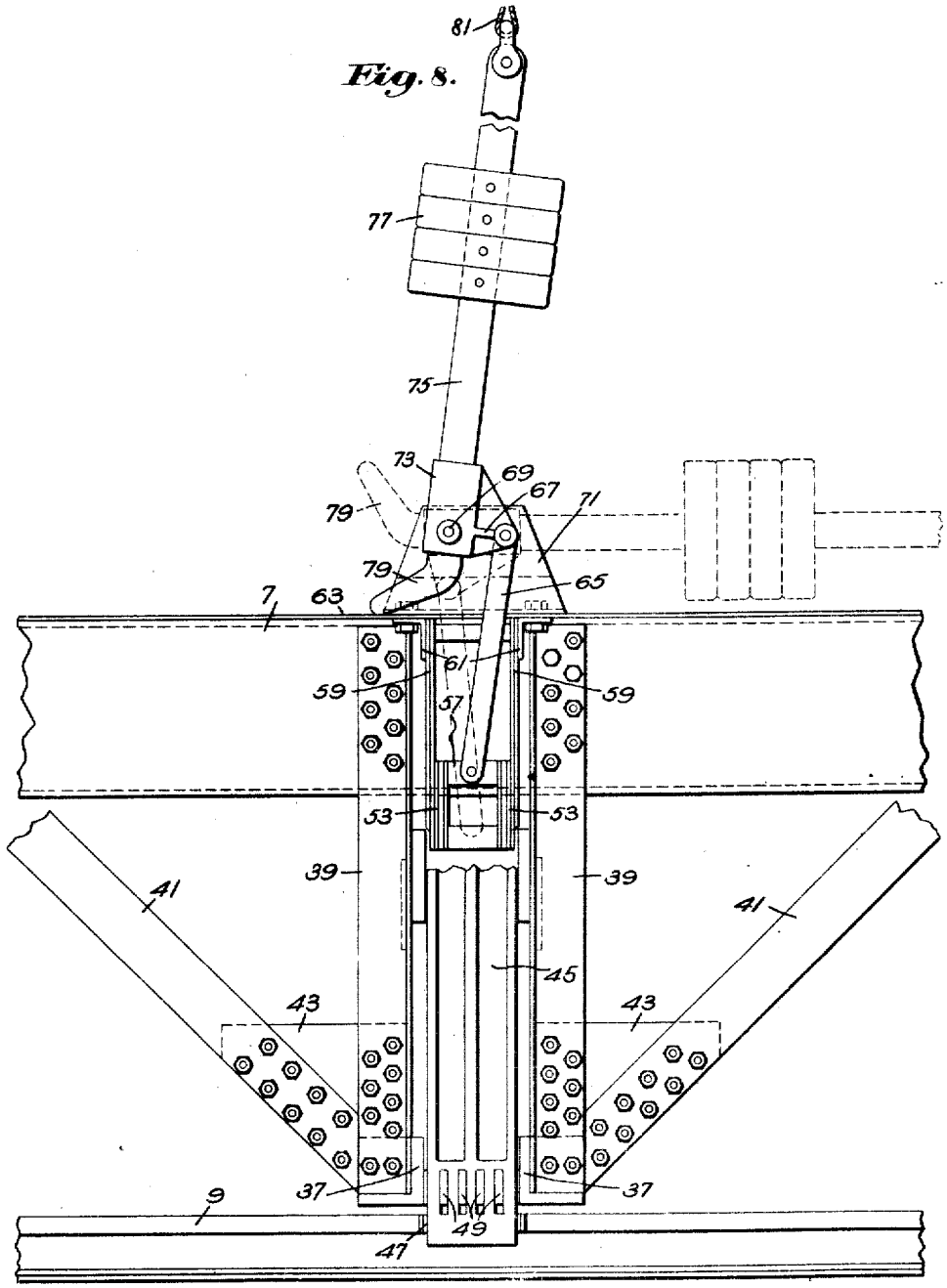

A. E. NORRIS.
RAIL CLAMP FOR CONVEYING STRUCTURES.
APPLICATION FILED NOV. 13, 1914. RENEWED NOV. 29, 1918.
1,308,859.
Patented July 8, 1919.
5 SHEETS—SHEET 5.
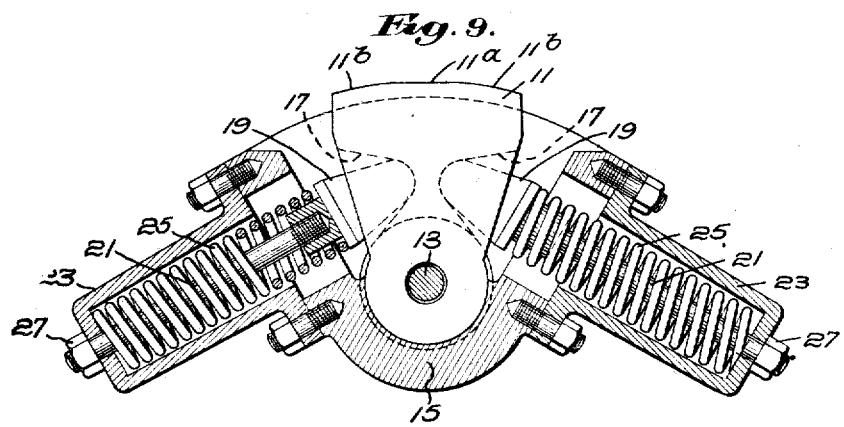
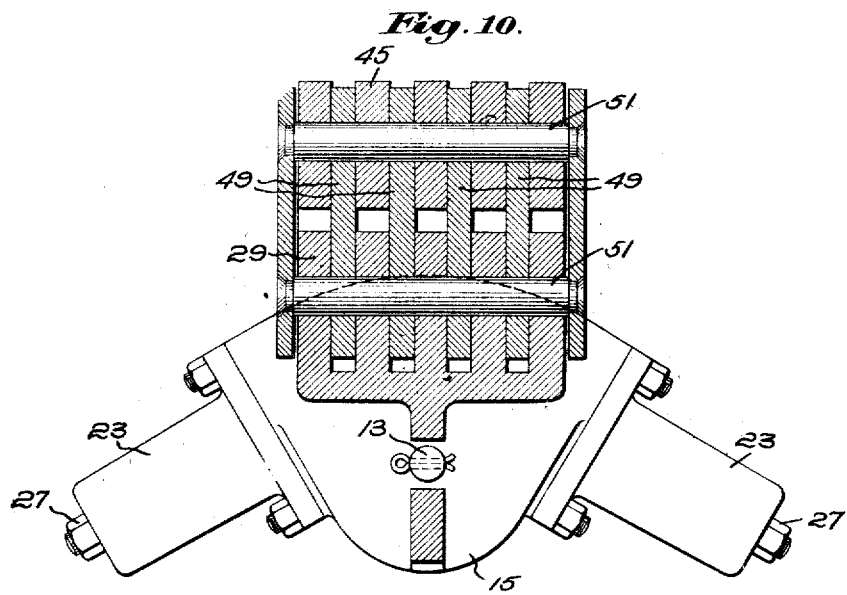

UNITED STATES PATENT OFFICE.

ALMON E. NORRIS, OF CAMBRIDGE, MASSACHUSETTS.

RAIL-CLAMP FOR CONVEYING STRUCTURES.

1,308,859.  Specification of Letters Patent.  Patented July 8, 1919.

Application filed November 13, 1914, Serial No. 872,029. Renewed November 29, 1918. Serial No. 264,721.

*To all whom it may concern:*

Be it known that I, ALMON E. NORRIS, a citizen of the United States, and a resident of Cambridge, county of Middlesex, State of Massachusetts, (whose post-office address is 31 Main street, Cambridgeport, Massachusetts,) have invented an Improvement in Rail-Clamps for Conveying Structures, of which the following description, in connection with the accompanying drawings, is a specification, like characters on the drawings representing like parts.

This invention relates to conveying bridge structures and the like having wheels adapted to travel along rails to locate the same in various positions as desired. Since these structures are usually large and present an extensive surface to the wind they are likely to be propelled thereby along the rails unless they are securely clamped thereto. The present invention aims to provide strong and effective means which may be readily operated to hold the structure securely to the rails.

The character of the invention may be best understood by reference to the following description of an illustrative embodiment thereof shown in the accompanying drawings, wherein:

Fig. 2 is a plan of the apparatus;

Fig. 3 is an end elevation of the apparatus;

Fig. 4 is a plan of a motor and brake controlled drum for operating the clamp;

Figure 1:
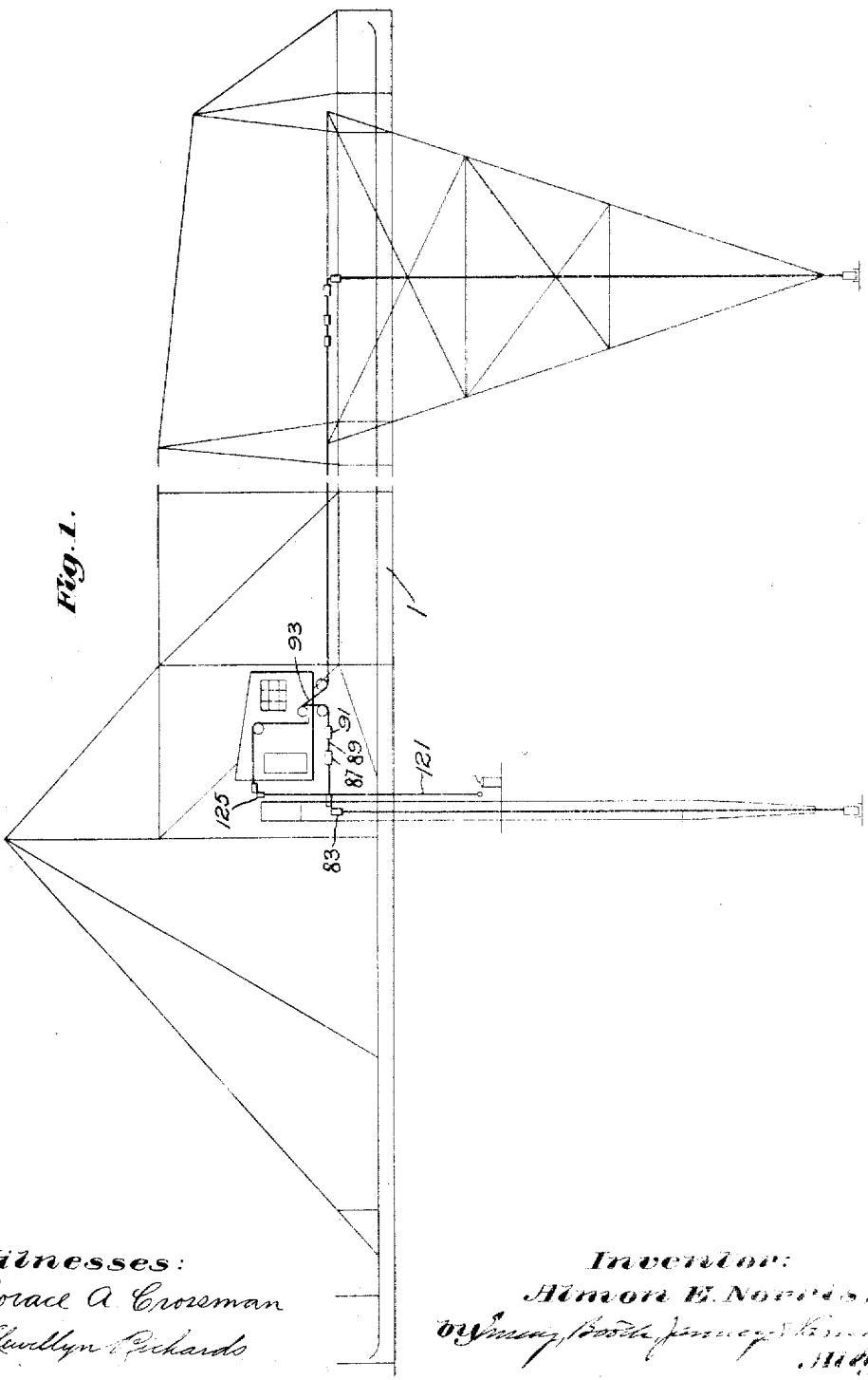
Figure 1 is a side elevation of an illustrative apparatus shown herein as embodying the invention.

Fig. 5 on an enlarged scale is a vertical section taken on line 5—5 of Fig. 3 showing clamp means adjusted to grip the rails;

Fig. 6 is a view similar to Fig. 5 showing the clamp means released from the rails;

Fig. 7 is a horizontal section taken on line 7—7 of Fig. 5;

Fig. 8 is a side elevation of the clamp means shown in Figs. 5 and 6 with parts in dotted and full line positions illustrating operative and inoperative positions of the clamp means;

Fig. 9 on an enlarged scale is a horizontal section taken on line 9—9 of Fig. 5; and Fig. 10 on an enlarged scale is a horizontal section taken on line 10—10 of Fig. 5.

Referring to the drawings, the illustrative apparatus shown therein as embodying the invention comprises a conveying bridge structure 1 (Fig. 1) mounted on wheels 3 (Fig. 3) journaled in bearings in frame members 5, 5 connected by channel bar frame members 7. As shown herein the structure is adapted to travel along four rails, a set of two rails 9, 9 being provided adjacent each end of the structure although any number of rails may be employed as required.

For purposes of illustration the structure is equipped with four clamps for securing the same to the rails although any number may be employed as desired. Since these clamps are similar in construction a description of one will suffice for all. Each clamp comprises opposed jaws adapted to grip the rail between them. The inner jaw is in the form of a cam 11 (Fig. 9) loosely pivoted on a pin 13 mounted in a segmental shaped housing 15 and adapted to have a bearing thrust on the rear curved wall of the housing. To normally maintain this cam in a central position it is provided with opposed lateral recesses 17 adapted to receive heads 19 of pins 21 mounted in casings 23 secured to the segmental housing 15. These pins are urged outward from their casings toward one another by helical springs 25 encircling said pins and confined between the heads 19 and the ends of the casings 23. The pins 21 project through the ends of said casings and receive nuts 27 which limit the inward movement thereof. By the construction just described the cam is normally held in a central position. The cam has a face of appropriate friction material presenting a flat portion 11$^a$ and curved portions 11$^b$ adapted to engage the side of the rail, as shown in Figs. 5 and 6. The springs 21 are sufficiently strong to prevent turning of the cam unless it is pressed against the rail. To press said cam jaw toward the rail, the outer jaw referred to is adjusted toward the same, as more fully hereinafter described.

The segmental casing 15, as shown herein, is integral with an arm 29 formed to present a lip 31 overlying the rail and recessed to receive a shoe 33 of friction material adapted to slide along the rail and support the arm 29 and the cam clamp member carried thereby as described. The arm 29 may be connected by a link 35 with a similar arm for coöperation with the other rail.

The arm 29 is mounted between horizontal angle bars 37 (Fig. 8) carried by vertical angle bars 39 depending from and secured to the channel bars 7 referred to. One or the other of the angle bars 37 is engaged by the clamp when the latter is secured to the rail and transmits the holding effect of the clamp to the structure. To contribute to the support of the angle bars 37, diagonal struts 41 are provided secured to the channel bars 7 and to a plate 48 which is also secured to the bars 39. To contribute to the positioning of the clamp means, the link 35 has a pin 35ª entered through a slot in a plate 44 fastened to the vertical bars 39.

Having described the cam clamp member and its support, next will be described the outer clamp member which is adapted to co-operate therewith to grip the rail between them. This outer member has an arm 45 (Fig. 5) with its lower end recessed to receive a shoe 47 of appropriate friction material adapted to engage the outer side of the rail. The arm 45 is pivotally connected to the arm 29 by a series of links 49 (Fig. 10) entered into opposed apertures in said arms, said links and arms having registering apertures for receiving pins 51.

If the left hand arm 45 is rocked in a contra-clockwise direction (Fig. 5) it will act through the links 49 and draw the clamping jaws toward one another to tightly grip the rail therebetween. Various devices may be employed for rocking the arm 45. As shown herein the arm 45 is rocked simultaneously with the similar arm 45 for the companion rail of the pair. To accomplish this the upper ends of said arms are pivotally connected by toggle links 53 with toggle links 55, the latter in turn being pivotally connected to a block 57. The links 53 and 55 are pivotally connected by fulcrum links 59 with an angle bar 61 extending transversely between the channel bars 7 and supported by a plate 63 thereon. The block is pivotally connected by operating links 65 with an arm of a rocker 67 fast on a pin journaled in bearings in brackets 71 secured to the plate 63. The rocker 67 is formed to present a sleeve 73 through which extends a lever 75 carrying a weight 77. A toe 79 on an end of said lever is adapted to engage the plate 63 to limit the upward rocking movement of the lever, as more fully hereinafter described.

When the lever 75 is drawn into the position shown in full lines in Figs. 6 and 8 the operating links are drawn upward, thereby lifting the block 57 and buckling the toggle links 53 and 55 and causing the fulcrum links 59 with scissor-like action to close to the position shown in Fig. 6. This will rock the upper ends of the arm 45 inward toward one another and their jaws outward away from the sides of the rails, thereby releasing the clamps.

When, however, the lever 75 is rocked downward to its position shown in full lines in Fig. 5 and in dotted lines in Fig. 8 the operating links 65 are thrust downward, thereby opening the fulcrum links 59 and straightening the toggle links 53 and 55. This will rock the upward ends of the arms 45 outward away from one another and cause their jaws to press against the outer faces of the rails. In so doing the arms will act through the links 49 and draw the jaws of the clamps into tight gripping engagement with the rails.

As stated, if wind blows against the conveying structure it will tend to propel the same along the track. In so doing it will tend to rock the cam clamp 11 against the resistance of one of the spring pressed pins 21. The flat gripping face 11ª of the cam member 11 has a radius less than the curved portions 11ᵇ thereof. Consequently if the structure tends to travel along the rails the cam member will be rocked slightly by virtue of its frictional engagement with the rail and present one or the other of the arc portions of longer radius to the rail. This will add to the pressure of the jaws against the rail and automatically increase the grip of the clamp thereon.

The levers 75 for opening and closing the jaws may be rocked by various devices as desired. As shown herein the levers 75 at one end of the structure are connected to the ends of a rope 81 which is led upward over guide pulleys 83 and 85 (Figs. 1 and 2) and looped around a pulley 87 of a double pulley block 89. About the other pulley 91 of said block is looped a rope 93 having one end anchored at a fixed point 95 and its opposite end attached to a drum 97.

The clamps for the opposite end of the structure are also connected by a similar arrangement of ropes to said drum. The drum 97 is mounted fast on a shaft 101 journaled in bearings on a frame 103, said drum being driven through a train of speed reduction gearing by an electric motor 105. The armature of this motor is fast on a shaft 107 journaled in bearings on the frame 103. To one end of this shaft is connected a brake wheel 109 adapted to be embraced by a strap 111, one end of which is anchored at 113. The other end is connected to a lever 115 fulcrumed on a standard 117 on the frame 103 and carrying a weight 119. This brake may be substantially the same as that shown in Patent No. 1,123,786 dated January 5, 1915, and operates automatically to hold the drum against unwinding and to permit the drum to have winding rotation. The lever 115 is connected to a rope 121 which passes over guide pulleys 123 and 125 and depends from the latter downward to the bridge propelling platform 127. On this platform is mounted a controller 129 for starting and stopping the motor 125.

In operation when it is desired to set the clamps the controlling rope is pulled, thereby rocking the lever 115 and releasing the brake, thereby permitting the clamp levers 75 to rock downward under the action of their weight and straighten the toggle links and press the clamping jaws into tight gripping engagement with the rails.

When it is desired to release the clamps the controller 129 is shifted to start the motor 105, thereby rotating the drum 99 and hoisting up on the rope 81. This will rock the clamp controlling lever 75 upward from the dotted to the full line position shown in Fig. 8, thereby buckling the toggles and releasing the clamps.

It will thus be seen that the cables which operate the weight-applied clamps at the separated truck units are brought together at a common controlling member on the bridge and are moved to apply or release the clamps by a common motor. The individual cables are so connected to the cables which are wound on the drum 97 that any difference in the movements of the individual clamping devices is equalized in the cables.

The structure shown herein comprises a main frame supported on front and rear piers. It is customary to skew or swing the main horizontal frame by advancing one of the piers along the rails ahead of the other. It is essential that the clamp controlling ropes should be arranged to prevent the operation of the clamps during such skewing movement. The disposition of the ropes described prevents this. For example, if the forward pier is advanced ahead of the rear pier the main horizontal frame of the structure will swing on a vertical axis substantially midway between the pulleys 85 (Fig. 2). This will swing the pulley 87 somewhat about said axis but this movement of said pulley will not affect the clamp operating rope 81 since said pulley will merely roll along the loop of the rope passing around the same.

It is to be understood that the clamp may be released by power or manually as desired.

By my invention is provided a simple, powerful clamp mechanism which will securely grip the rails and prevent any possibility of the inadvertent propulsion of the structure along the same.

Having described one illustrative embodiment of the invention without limiting the same thereto, what I claim as new and desire to secure by Letters Patent is:

1. A device for securing a structure to a rail comprising jaws for engagement with said rail, a carrier for said jaws, and means for pressing said jaws toward said rail, one of said jaws being movable independently of said means and having provision for automatically increasing the grip of said jaws on the rail as the structure tends to travel along the same.

2. A device for securing a structure to a rail comprising jaws for engagement with said rail, arms carrying said jaws, and means for moving one of said arms to cause said jaws to grip the rail, one of said jaws being movable relatively to its arm for increasing its grip on the rail as the structure tends to move along the same.

3. A device for securing a structure to a rail comprising jaws, arms carrying said jaws, and means operating through said arms for pressing said jaws toward said rail, one of said jaws being movable transversely to the plane of its arm for increasing its grip on the rail.

4. A device for securing a structure to a rail comprising arms, a jaw fixed on one of said arms and a cam jaw on and movable relatively to said other arm, and means operating on said arms for pressing said jaws toward the rail, said cam having a flat portion normally for engagement with the rail and portions of longer radius for automatically increasing the grip on the rail if the structure tends to move along the same.

5. A device for securing a structure to a rail comprising jaws, means for pressing said jaws toward said rail and springs for engagement with opposite sides of one of said jaws tending to hold the same in an active mid position.

6. A device for securing a structure to a rail comprising jaws for engagement with said rail, a carrier for said jaws, means for holding said jaws in gripping engagement with said rail, one of said jaws being movable independently of said means, and means tending to maintain said last named jaw yieldingly in a mid position.

7. The combination with jaws, of arms carrying the same, a casing on one of said arms receiving one of said jaws, and means operating through said arms for pressing said jaws against a rail.

8. The combination with jaws for engagement with a rail, of arms carrying said jaws, a casing on one of said arms receiving one of said jaws, and spring-pressed plungers in said casing for positioning the jaw therein.

9. The combination with carrier members, a jaw on one of said members, a casing on the other member, a jaw mounted in said casing and movable relatively thereto, spring means tending to hold said jaw in a predetermined position in said casing, and means coöperating with said carrier members for causing said jaws to grip a rail.

10. The combination with carrier members of a jaw on one of said members, a casing on the other member, a cam-faced jaw in said casing having a flattened rail-engaging portion and rail-engaging portions at opposite sides thereof of longer radius, and means tending to hold said jaw with said flattened portion in active engagement with the rail.

11. The combination with carrier members of a jaw on one of said members, a casing on the other member, a jaw loosely mounted in said casing adapted for end-thrust engagement with a wall of said casing, and means tending to hold said jaw in a predetermined position in said casing.

12. A device for securing a structure to a rail, comprising jaw carrying members for presentation at opposite sides of a rail, a jaw mounted to swing about a center on one of said members and having portions arranged at different distances from the center, and means to hold the same normally in a given angular position relative to said center.

13. A device for securing a structure to a rail, comprising opposed jaw carrying arms, means for swinging said arms to close the jaws on the rail, one jaw being mounted to swing about a center on one of said arms and having portions arranged at different distances from the center, and means to hold the same normally in a given angular position relative to said center.

14. The combination with jaws for engagement with a rail, of members carrying said jaws, toggle link means for said members, and a weighted lever connected to said toggle link means for operating the same to cause said jaws to grip said rail.

15. In a device for securing a traveling structure to a rail, the combination with jaws for engagement with a rail, of members carrying said jaws, a shoe for engagement with the top of the rail to support said members during the movement of the structure along the rail, and means for pressing said jaws into tight, gripping engagement with said rail.

16. In a device for securing a traveling structure to a rail, the combination with jaws for engagement with a rail, of means carrying said jaws having a supporting member adapted to slide along the top of the rail during the movement of the structure along the rail, and means for pressing said jaws against said rail.

17. The combination with a conveying structure, of a truck therefor adapted to travel along a rail, and means to secure said truck to the rail comprising jaws, and means for moving said jaws into or out of locking engagement with the rail, one of said jaws having provision for increasing the grip thereof on the rail if the truck tends to travel along the same.

18. The combination with a conveying bridge structure, of a truck therefor adapted to travel along a rail, and means to secure said truck to said rail comprising jaws, means carrying said jaws, means for pressing said jaws against the rail including a lever having a weight thereon, and means for releasing said jaws including a drum, a cable connecting said lever with said drum, and a motor for driving said drum.

19. The combination with a conveying structure, of a truck adapted to travel along a rail, and means for securing said truck to said rail comprising jaws, means including a weighted lever for causing said jaws to grip the rail, and means mounted on said structure remote from said truck for operating said weighted lever to release said jaws from said rail.

20. The combination with jaws 11 and 47 for engagement with a rail, of a casing 15 for one of said jaws, arms 29 and 45 carrying said parts, and means including a lever 75 and a weight 77, for causing said jaws to grip said rail.

21. The combination with carrier members 29 and 45, of a jaw 47 for the arm 45, a jaw 11 for the arm 29, having a flattened rail-engaging portion 11ᵃ, and rail-engaging portions at opposite sides thereof of longer radius, a casing 15 for said jaw 11, rods 21, and springs 25 coöperating with said rods tending to yieldingly hold said jaw 11 in position with its portion 11ᵃ in active engagement with the rail.

22. A traveling bridge adapted for travel upon a suitable trackway and having a plurality of supporting trucks and provided with a plurality of weight-applied rail clamping devices located at separated points on said bridge structure, a flexible rope or cable connected to each clamping device on the bridge structure, and a common motor for moving the cables to release the clamping devices.

23. A traveling bridge adapted to move along a suitable trackway and a plurality of separate supporting truck units provided each with a rail clamping device, a weight located in the immediate vicinity of each clamping device and acting to move the same into a clamping position, a flexible rope or cable connected to each clamping device on the bridge structure, and a common motor for moving the cables to lift the weights and release the clamps.

24. A traveling bridge adapted to travel along a suitable trackway having a plurality of separately located supporting truck units provided each with a rail clamping device, toggle links for actuating each clamping device, a weight for moving said toggle links into closed or clamping position, a flexible rope or cable connected to lift each weight and release its clamp, said several ropes or cables being connected to a common controller on the bridge structure, and a common motor for moving the cables to release the clamps.

25. In a traveling bridge, the combination with a plurality of separated, weight-applied, rail clamping devices for clamping said bridge structure to a trackway, a flexible rope or cable extending from each clamping device on the bridge structure and connected to a common controlling member, a common motor for moving the cables to release the clamps, and equalizing connections between the separate cables and the common motor.

26. In a rail clamping device for traveling bridges, the combination with rail clamping jaws, of toggle link means for moving the jaws to clamp a rail, and a weight connected to move the toggle link means into jaw clamping position.

27. In a rail clamping device for traveling bridges, a plurality of clamping devices situated at separated points on the bridge structure, each clamping device having jaws for engagement with the rail, and means for operating the jaws located in the vicinity of each clamping device, said means comprising toggle link means to close the jaws and a weight to move the toggle links.

28. A traveling bridge adapted to move along a suitable trackway having a plurality of separately located rail clamps, a cable for operating each of said clamps, said cables being connected to a common rope-winding drum, and means for turning said drum.

29. In a rail clamp for a bridge structure, clamping devices, a weight for applying said clamping devices to the rail, a motor for lifting the weight and releasing said clamps, a mechanical brake for holding the weight lifted and the clamps released, and means for releasing the brake to lower the weight.

30. A traveling bridge adapted to travel upon a suitable trackway and having a plurality of supporting trucks provided with a plurality of rail clamps located at separated points on said bridge structure and a flexible rope or cable connected to each clamp, and a motor for moving the cable to release the clamps.

31. A rail clamp device for securing a traveling structure to a rail comprising clamping means, means controllable by an operator for applying said clamping means to clamp the structure to the rail, and means automatically responsive to movement of the structure in either direction upon said rail to increase the gripping action of the clamp with the rail.

32. A rail clamp device for securing a traveling structure to a rail, comprising clamping means, means controllable by an operator for placing said clamping means in clamping position with relation to the rail, and means responsive to movement of the structure in either direction upon the rail to cause gripping engagement of the clamp with the rail.

33. A rail clamp device for securing a traveling structure to a rail comprising clamping means adapted to be placed in gripping engagement with the rail, means automatically responsive to movement of the structure upon said rail when the structure is clamped thereto to increase the gripping engagement of the clamp with the rail, and means independent of the automatic means and controllable at will by an operator for applying or releasing said clamp.

34. A rail clamp device for securing a traveling structure to a rail comprising clamping means, means controllable by an operator for applying said clamping means to clamp said structure to the rail, said clamping means including a movable member adapted to be displaced by a frictional contact of the clamping means with the rail when the structure starts to move in either direction from the position where it is clamped to the rail, said member by its movement serving to increase the gripping engagement of the clamp with the rail.

35. A rail clamp device for securing the traveling structure to a rail comprising clamping means including a movable member, the latter adapted to be displaced by frictional contact of the clamping means with the rail, when the structure starts to move in either direction on the rail, said member by its movement serving to cause gripping engagement of the clamp with the rail, and means to move said clamping means into frictional contact with the rail.

36. A traveling bridge adapted to travel along a substantially horizontal trackway and having a rail clamp the latter provided with means for enforcing a gripping pressure when applied to the rail, automatically responsive to movement of the bridge in either direction upon said rail.

37. A rail clamp for a traveling bridge having jaws adapted to engage a rail on which the bridge is guided, means for applying the jaws to the rail, and means automatically responsive to the movement of the bridge in either direction when said jaws are applied to force gripping engagement of the jaws with the rail.

38. A traveling bridge adapted for travel upon the two separated tracks of a trackway and comprising a bridge portion with an upright supporting structure for each of said tracks, a plurality of rail clamps upon each of said uprights, track-engaging, supporting structures, an individual clamp applying weight, and an individual weight-lifting cable for each clamp, said cables leading from the supporting structures to the bridge portion of the structure, motive means on said bridge portion for moving the cables together, and a controller for said motive means.

39. A traveling bridge adapted for travel upon the two tracks of a suitable trackway and comprising a bridge portion and a plurality of upright supporting structures, one for each track, and upon which the bridge portion is carried, a rail clamp upon each of said upright supporting structures, clamp-operating cables leading from each clamp to the bridge portion of the structure, motive means on the bridge portion for moving said cables together, and a controller for said motive means.

40. A traveling bridge adapted for travel upon the two tracks of a suitable trackway and comprising a bridge portion with a plurality of rail clamps, a clamp-applying weight for each clamp, motive means for moving said weights and releasing the clamps, and a cable for each clamp through which the motive means is connected to the clamp and through which it acts to release the same.

41. A traveling bridge adapted for travel upon a suitable trackway having a plurality of rail clamps, each clamp having an individual clamp-applying weight and an individual weight-raising cable, motive means acting through said cables to release said clamps simultaneously, an operator's stand, and a controller at the operator's stand for controlling said motive means.

42. A traveling bridge adapted to travel upon the two tracks of a suitable trackway and comprising a bridge portion and an upright supporting structure engaging each track, supporting trucks for each track engaging structure, a plurality of rail clamps on one of said structures adjacent said trucks, each clamp having an individual clamp-applying weight and a clamp-lifting cable, and motive means for raising said weights simultaneously.

In testimony whereof I have signed my name to this specification in the presence of two subscribing witnesses.

ALMON E. NORRIS.

Witnesses:
HENRY T. WILLIAMS,
ROBERT H. KAMMLER.